(12) United States Patent
Nanbu et al.

(10) Patent No.: US 7,011,246 B2
(45) Date of Patent: Mar. 14, 2006

(54) PORTABLE CARD READER AND CARD SETTLEMENT SYSTEM

(75) Inventors: Kazutaka Nanbu, Kameoka (JP); Masaharu Ohnishi, Kyoto (JP)

(73) Assignee: Sagawa Express Co., Ltd., Kyoto (JP)

( * ) Notice: Subject to any disclaimer, the term of this patent is extended or adjusted under 35 U.S.C. 154(b) by 0 days.

(21) Appl. No.: 10/488,097

(22) PCT Filed: Sep. 10, 2002

(86) PCT No.: PCT/JP02/09202

§ 371 (c)(1),
(2), (4) Date: Oct. 5, 2004

(87) PCT Pub. No.: WO03/023672

PCT Pub. Date: Mar. 20, 2003

(65) Prior Publication Data

US 2005/0035190 A1    Feb. 17, 2005

(30) Foreign Application Priority Data

Sep. 10, 2001   (JP)   .............................. 2001-274076

(51) Int. Cl.
  *G06K 5/00*   (2006.01)
(52) U.S. Cl. ........................................ 235/380; 705/77
(58) Field of Classification Search ................ 235/379, 235/380, 381, 383; 902/22, 38, 40; 705/77, 705/80, 64, 70
  See application file for complete search history.

(56) References Cited

U.S. PATENT DOCUMENTS

| | | | | |
|---|---|---|---|---|
| 5,159,560 A | * | 10/1992 | Newell et al. | 700/215 |
| 5,208,446 A | * | 5/1993 | Martinez | 235/380 |
| 5,294,782 A | * | 3/1994 | Kumar | 235/380 |
| 5,334,824 A | * | 8/1994 | Martinez | 705/41 |
| 5,386,106 A | * | 1/1995 | Kumar | 235/380 |
| 5,489,773 A | * | 2/1996 | Kumar | 235/380 |
| 5,500,517 A | * | 3/1996 | Cagliostro | 235/486 |
| 5,679,943 A | * | 10/1997 | Schultz et al. | 235/472.02 |
| 5,734,722 A | * | 3/1998 | Halpern | 235/380 |
| 5,811,770 A | * | 9/1998 | Bonnemoy | 235/380 |

(Continued)

FOREIGN PATENT DOCUMENTS

EP    1014317 A1  *  6/2000

(Continued)

OTHER PUBLICATIONS

Yoshiyuki Ito, "e-Business Creator Sagawa Kyubin/ e s (Kessai & Haiso Joho Service)", Network Computing, Oct. 1, 2000, vol. 12, No. 10, pp. 47 to 51.

*Primary Examiner*—Uyen-Chau N. Le
(74) *Attorney, Agent, or Firm*—Oblon, Spivak, McClelland, Maier & Neustadt, P.C.

(57) ABSTRACT

A portable card reader device performs storing credit card inquiry information and freight information of a plurality of consumers that exist in a certain delivery area at a hard disk, reading information of settlement credit card for settlement by a card reader, and inputting the method of payment for the amount money for merchandise by a keyboard when the merchandise is handed to a consumer, performing credit inquiry based on stored credit card inquiry information of a plurality of consumers and the read settlement card information of the consumer at a control unit, and settling the amount money for the merchandise according to freight information when the settlement credit card is valid as a result of the credit card inquiry.

10 Claims, 14 Drawing Sheets

U.S. PATENT DOCUMENTS

| | | | |
|---|---|---|---|
| 5,844,219 A * | 12/1998 | Wallner | 235/380 |
| 5,932,869 A * | 8/1999 | Gottlich et al. | 235/493 |
| 6,064,987 A * | 5/2000 | Walker et al. | 705/38 |
| 6,116,506 A * | 9/2000 | Matsumoto et al. | 235/382.5 |
| 6,366,929 B1 * | 4/2002 | Dartigues et al. | 707/200 |
| 2002/0008145 A1 * | 1/2002 | Walsh et al. | 235/462.46 |
| 2002/0026413 A1 * | 2/2002 | Wu | 705/39 |

FOREIGN PATENT DOCUMENTS

| | | | |
|---|---|---|---|
| EP | 1327946 A1 * | 7/2003 | |
| EP | 1329825 A1 * | 7/2003 | |
| GB | 2317488 A * | 3/1998 | |
| JP | 07319971 A * | 12/1995 | |
| JP | 8-44914 | 2/1996 | |
| JP | 9-114892 | 5/1997 | |
| JP | 9-282382 | 10/1997 | |
| JP | 10-69573 | 3/1998 | |
| JP | 10-69580 | 3/1998 | |
| JP | 11-161698 | 6/1999 | |
| JP | 2002183638 A * | 6/2002 | |
| WO | WO 9746986 A1 * | 12/1997 | |

* cited by examiner

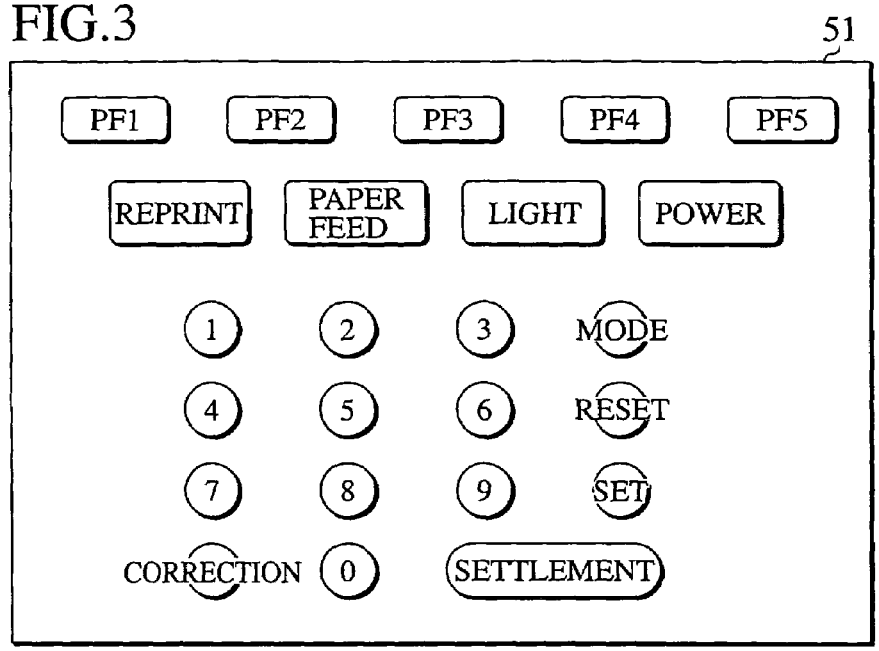
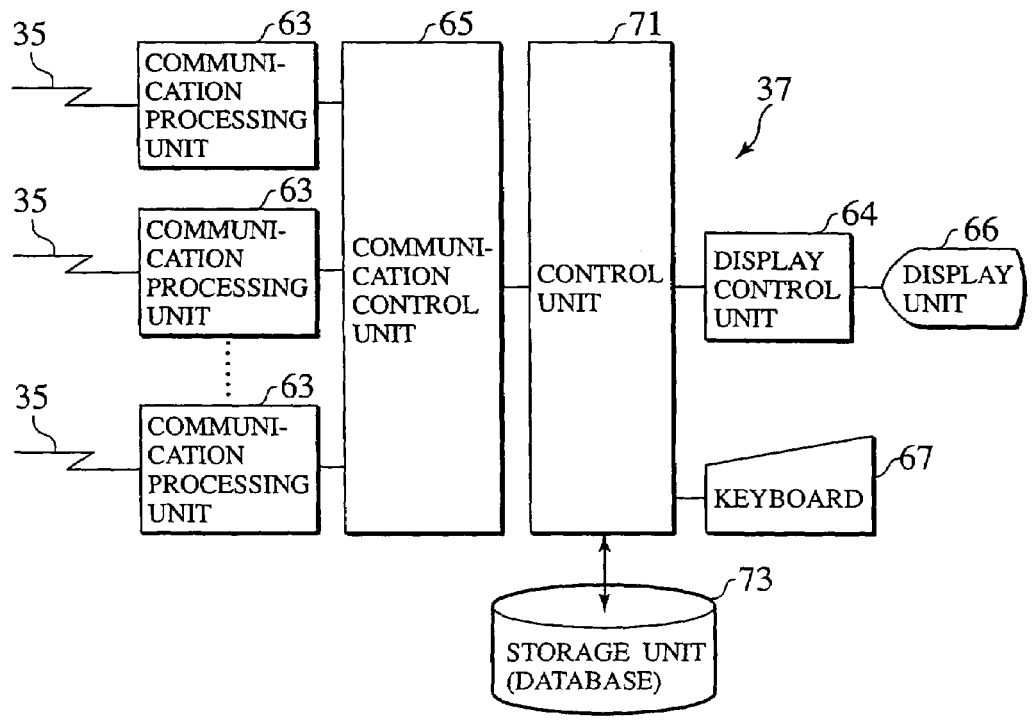

| NO. | TRANSACTION INFORMATION | CARD INFORMATION | TERMINAL INFORMATION | ACCOUNT INFORMATION |
|---|---|---|---|---|
| 1 | TRACING CODE<br><br>MONEY AMOUNT FOR MERCHANDISE<br><br>MERCHANDISE CLASSIFICATION | CREDIT CARD COMPANY INFORMATION | TERMINAL IDENTIFICATION NUMBER | TRANSACTION CONTENT<br><br>DEPOSITED AMOUNT |
| | | | | |
| | | | | |

FIG.10

| CARDNET | | | |
|---|---|---|---|
| [CREDIT CARD SALES SLIP] (DATA GATHER) | | | |
| CREDIT CARD COMPANY | | | |
| TERMINAL NUMBER | 12345-123-12345 R | | |
| MEMBER NUMBER | 1234-1234-1234-1234 | | |
| TRACING NUMBER 00001 | EXPIRATION DATA 01/12 | HANDLING CONTENT SALES | |
| PAYMENT GROUP INSTALLMENT PLAN PAYMENT | NUMBER OF PAYMENT 10 TIMES | HANDLING GROUP 001 | |
| MERCHANDISE GROUP | OPERATION SERIES NUMBER 123456 | | |
| MONTH OF BEGINNING | | | |
| DATE | 2000/04/21 | 10:00:00 | |
| AUTHORIZATION NUMBER | | 123456 | |
| MERCHANDISE CLASSIFICATION 100 | TRACING NUMBER | 0123456789 | |
| PRICE | | ¥10,500 | |
| TAX AND OTHER AMOUNT | | ¥0 | |
| | | ¥10,500 | |
| SIGNATURE | | | |
| THANK YOU | | | |
| DEPARTMENT | CLARK | | |
| | | CREDIT CARD COMPANY | |

93

PRINTING NUMBER OF THE PAYMENT WHEN INSTALLMENT PLAN PAYMENT CHOSEN

PRINTING
"LUMPSUM PAYMENT"
"INSTALLMENT PLAN PAYMENT"
"REVOLVING PLAN PAYMENT"
"BONUS MONTH PAYMENT"
"BONUS MONTH AND INSTALLMENT PLAN PAYMENT"

FIG.12

```
              DAILY LIST

TERMINAL NUMBER : 9999-999-99999
YYYY/MM/DD HH:MM

< CREDIT >
< 102:A CREDIT >
TIME  OPERATION  SERVICE  HANDLING
      NUMBER              GROUP
TRACING  AUTHORIZATION
NUMBER   NUMBER

MEMBER/ACCOUNT NUMBER
MERCHANDISE      TRACING
CLASSIFICATION   NUMBER
INQUIRY          AMOUNT
DATE             MONEY

*HH:MM 999999 X999  999
99999   XXXXX(MM/DD)
9999999999999999
100         0123456789
YYYY/MM/DD  ¥¥,¥¥¥,¥¥9
*HH:MM 999999 X999  999
99999   XXXXX(MM/DD)
9999999999999999
200         0123456789
YYYY/MM/DD  ¥¥,¥¥¥,¥¥9
*HH:MM 999999 X999  999
99999   XXXXX(MM/DD)
9999999999999999
300         0123456789
YYYY/MM/DD  ¥¥,¥¥¥,¥¥9

<< A CREDIT CARD TOTAL >>
           NUMBER    AMOUNT
LUMP-SUM
PAYMENT    ZZ9   ¥,¥¥¥,¥¥¥,¥¥9

TOTAL      ZZ9   ¥,¥¥¥,¥¥¥,¥¥9

< 102:B CREDIT >
TIME  OPERATION  SERVICE  HANDLING
      NUMBER              GROUP
TRACING  AUTHORIZATION
NUMBER   NUMBER

MEMBER/ACCOUNT NUMBER
MERCHANDISE      TRACING
CLASSIFICATION   NUMBER
INQUIRY          AMOUNT
DATE             MONEY

*HH:MM 999999 X999  999
99999   XXXXX(MM/DD)
9999999999999999
XXX             XXXXXXXXXX
YYYY/MM/DD  ¥¥,¥¥¥,¥¥9
```

```
*HH:MM 999999 X999  999
99999   XXXXX(MM/DD)
9999999999999999
XXX             XXXXXXXXXX
YYYY/MM/DD  ¥¥,¥¥¥,¥¥9
*HH:MM 999999 X999  999
99999   XXXXX(MM/DD)
9999999999999999
XXX             XXXXXXXXXX
YYYY/MM/DD  ¥¥,¥¥¥,¥¥9

<< A CREDIT CARD TOTAL >>
           NUMBER    AMOUNT
LUMP SUM
PAYMENT         ZZ9   ¥¥,¥¥¥,¥¥9

INSTALLMENT
PLAN PAYMENT    ZZ9   ¥¥,¥¥¥,¥¥9

REVOLVING
PLAN PAYMENT    ZZ9   ¥¥,¥¥¥,¥¥9

TOTAL           ZZ9   ¥¥,¥¥¥,¥¥9

<< CREDIT TOTAL >>
           NUMBER    AMOUNT
LUMP SUM
PAYMENT         ZZ9   ¥¥,¥¥¥,¥¥9

INSTALLMENT
PLAN PAYMENT    ZZ9   ¥¥,¥¥¥,¥¥9

REVOLVING
PLAN PAYMENT    ZZ9   ¥¥,¥¥¥,¥¥9

TOTAL           ZZ9   ¥¥,¥¥¥,¥¥9
```

ADD UP EACH METHOD OF PAYMENT

~97

PORTABLE CARD READER AND CARD SETTLEMENT SYSTEM

TECHNICAL FIELD

This invention relates to a portable pay-by-card reader device and its payment system for home delivery service that can settle a payment when a consumer receives merchandise by home delivery contractor.

BACKGROUND ART

Upon the rapid progress of information technology, it is said that the demands of home delivery service have been expanding by transfiguration of communication, such as an Internet, between consumer and merchant.

For example, a consumer can shop on virtual Internet shopping mall established on the Internet web site by personal computer and orders merchandise to be delivered to him/her.

When the merchandise delivered, the consumer pays the amount of money by cash.

However, the consumer needs to have exact amount of money to pay at a door when the merchandise delivered. It could happen that if he/she doesn't have cash at that time and the payment cannot be settled then.

DISCLOSURE OF THE INVENTION

The present invention has been made in consideration of the foregoing problem, and an object of thereof is to provide a prompt payment system and pay-by-card system by a portable card reader device that can offer consumer to settle the amount by card instantly when they received the merchandise by home delivery service.

The gist of the present invention to solve the aforementioned problem by a portable card reader and pay-by-card system are as follows. The portable card reader carried by home delivery contractor, who is responsible to deliver merchandise to the consumer located in certain designated delivery area is the device means for; settling the amount of money of the merchandise; memorizing credit inquiry information and freight information of plurality of consumers within above said designated delivery area; reading information out of a settlement card for use in settlement by the consumer upon delivery of the merchandise to the consumer; inputting payment method for the merchandise; performing a credit inquiry based on the above said memorized credit card inquiry information and by the above said read information out of a settlement card; and settling the amount of the payment regarding to the freight information when a result of the settlement credit inquiry is valid.

The gist includes a settling method for performing settlement of merchandise by the portable card reader device, wherein it receives credit inquiry regarding to plurality of consumers who exist within certain delivery area from each the settlement server at the credit card company, that memorizing credit inquiry information of plural of consumer and sending credit inquiry when it is necessary, home delivery management server, that stores freight information of puerility of freight, at the home delivery contractor to send freight information when it is necessary, settlement server of credit card company at home delivery service shop through a wireless communication line, the communication terminal that receiving freight information regarding to the above said plurality of the consumer sent from the home delivery management server at the home delivery contractor through wireless communication line, it receives and stores credit inquiry and freight information regarding to plurality of consumers who exist within certain delivery area from above said communication terminal, it reads credit card information on the settlement credit card for settlement, and inputs the method of the payment when the merchandise is handed to the consumer, it performs settlement based on the stored credit inquiry of the plurality of consumers and read out credit card information for settlement, settle the amount money for the merchandise included in the freight information when the settlement information is valid as a credit inquiry result.

In the addition, the characterization of another credit card settlement system includes for connecting the portable credit card reader, which can read information on the credit card, and home delivery management server of delivery service contractor by wireless communication line; for each delivery, sending a card information that is read by portable card reading device to sever of the credit card company performing the settlement in the card settlement system of wireless communication line between the home delivery management server and server of the credit card company performing the settlement; obtaining credit inquiry of this card through sever of the credit card company performing the settlement by the portable card reader device, and according to above credit inquiry, settling by the credit card when the credit card is valid.

BRIEF DESCRIPTION OF THE DRAWINGS

FIG. 3 is a view of showing a structure of keyboard 51 on the portable card reader device 22.

FIG. 4 is a view of a structure showing a server 37 of the credit card company performing the settlement.

FIG. 10 is a credit sales slip 93 printing out of a printer 61.

FIG. 12 is a daily list 97 printing out of the printer 61.

BEST MODES FOR CARRYING OUT THE INVENTION

Figure 1:
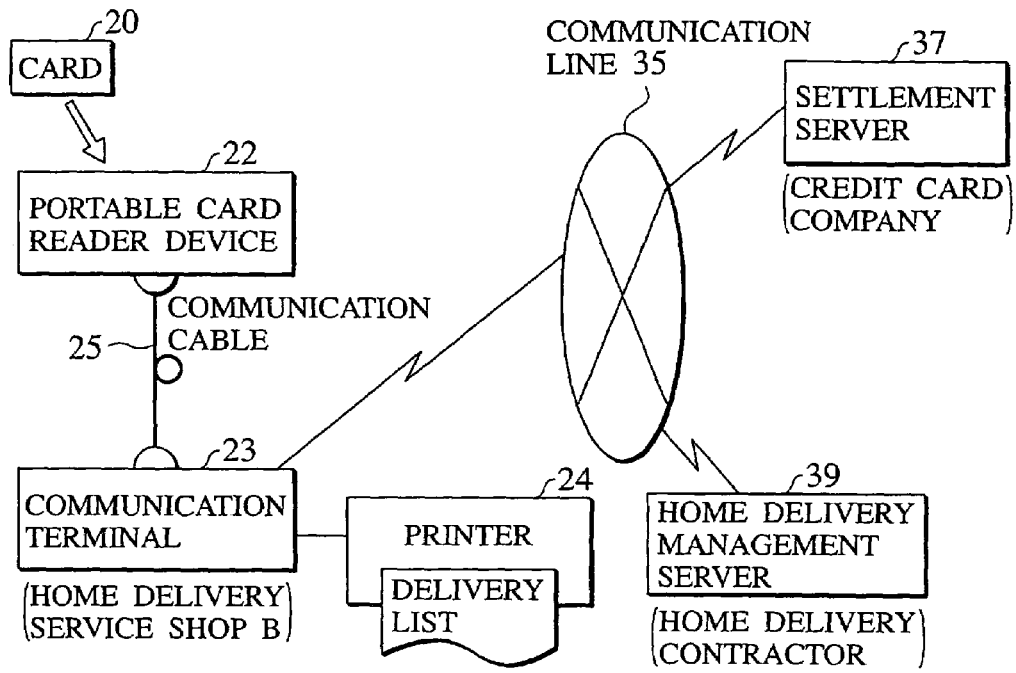
FIG. 1 is a view showing a pay-by-card system for a home delivery service according to the first embodiment of present invention.

The gist of the present invention to solve the aforementioned problem by a portable card reader and pay-by-card system are as follows. The portable card reader device carried by home delivery contractor, who is responsible to deliver merchandise to the consumer located in certain designated delivery area is means for: settling the amount of money of the merchandise; memorizing both credit inquiry information and freight information of plurality of consumers within above said designated delivery area; reading information out of a settlement card for use in settlement by the consumer upon delivery of the merchandise to the consumer; inputting payment method for the merchandise; performing a credit inquiry based on the above said memorized credit card inquiry information and by the above said read information out of a settlement card; and settling the amount of the payment regarding to the freight information when a result of the settlement credit inquiry is valid.

Moreover, the gist including the portable card reader device is means for issuing receipt based on the information on the price for the merchandise when a result of the credit inquiry from the server is valid.

In the addition, the gist including the portable card reader device is means for printing receipt with a method of payment such as a lump-sum payment, installment plan payment, and revolving payment when one of the method of payment chosen Additionally, the gist includes means for printing receipt with the number of times for the payment such as a lump-sum payment, installment plan payment, and revolving payment based on the inputted information by the printing receipt mean.

Moreover, the gist includes means for printing receipt including list of the total number and total amount of a lump-sum payment, installment plan payment, and revolving payment as a daily list of plural of consumers.

To solve the above said problem, the gist includes the means for storing credit inquiry that includes black list that indicates credit card number of unacceptable credit card user, and means for preventing unacceptable credit card includes generating unacceptable card information when the credit card number of unacceptable credit card user based on the above said memorized credit card inquiry information matches the credit card number of consumer who is receiving merchandise and settling the amount of money.

According to present invention, the pay-by-card portable reading device memorizing credit inquiry and freight information of plural consumer of certain designated delivery area, when hand the merchandise to consumer reading information on the credit card, inputting the payment method, performing credit inquiry based on memorized credit inquiry information of plural consumer and information on the settling card, when the credit card is valid, consumer is able to settle the payment based on the freight information by credit card for the merchandise which is delivered by home delivery service. As a result, a consumer who ordered merchandise enjoys convenience and security by using credit card to settle the payment without having cash in advance for the merchandise that will be delivered.

The gist includes a settling method for performing settlement of merchandise by the portable card reader device, wherein it receives credit inquiry regarding to plurality of consumers who exists within certain delivery area from each the settlement server at the credit card company, that memorizing credit inquiry information of plural of consumer and sending credit inquiry when it is necessary, home delivery management server, that stores freight information of puerility of freight, at the home delivery contractor to send freight information when it is necessary, settlement server of credit card company at home delivery service shop through a wireless communication line, the communication terminal that receiving freight information regarding to the above said plurality of the consumer sent from the home delivery management server at the home delivery contractor through wireless communication line, it receives and stores credit inquiry and freight information regarding to plurality of consumers who exist within certain delivery area from above said communication terminal, it reads credit card information on the settlement credit card for settlement, and inputs the method of the payment when the merchandise is handed to the consumer, it performs settlement based on the stored credit inquiry of the plurality of consumers and read out credit card information for settlement, settle the amount money for the merchandise included in the freight information when the settlement information is valid as a credit inquiry result.

The gist includes the method when handing the merchandise to consumer and payment completed, memorizing the credit inquiry information and freight information of the consumer as an settled information, and sending the memorized settled information to above said communication device, that sends received settled information from portable card reading device to server of the credit company performing the settlement and home delivery management server of home delivery contractor by wireless communication line.

Above the gist of above said portable card reader device includes deleting settlement information stored at the above said means for settlement information memory after sending the settlement information stored at the above said means for settlement information memory to the above said communication terminal.

According to the present invention that settling method for performing settlement of merchandise by the portable card reader device, can provides wherein it receives credit inquiry regarding to plurality of consumers who exists within certain delivery area from each the settlement server at the credit card company, that memorizing credit inquiry information of plural of consumer and sending credit inquiry when it is necessary, home delivery management server, that stores freight information of puerility of freight, at the home delivery contractor to send freight information when it is necessary, settlement server of credit card company at home delivery service shop through a wireless communication line, the communication terminal that receiving freight information regarding to the above said plurality of the consumer sent from the home delivery management server at the home delivery contractor through wireless communication line, it receives and stores credit inquiry and freight information regarding to plurality of consumers who exist within certain delivery area from above said communication terminal, it reads credit card information on the settlement credit card for settlement, and inputs the method of the payment when the merchandise is handed to the consumer, it performs settlement based on the stored credit inquiry of the plurality of consumers and read out credit card information for settlement, settle the amount money for the merchandise included in the freight information when the settlement information is valid as a credit inquiry result to settle the amount money for the merchandise delivered by home delivery service by credit card.

As a result, a consumer who ordered merchandise enjoys convenience and security by using credit card without having cash in advance for the merchandise that will be delivered.

In addition, a characterization of another credit card settlement system includes for connecting the portable credit card reader, which can read information on the credit card, and home delivery management server of delivery service contractor by wireless communication line; for each delivery, sending a card information that is read by portable card reading device to sever of the credit card company performing the settlement in the card settlement system of wireless communication line between the home delivery management server and server of the credit card company performing the settlement; obtaining credit inquiry of this card through sever of the credit card company performing the settlement by the portable card reader device, and according to above credit inquiry, settling by the credit card when the credit card is valid.

First embodiment of the present invention will be described below with reference of the drawings.

FIG. 1 is a view showing a credit card settlement system according to a first embodiment of the present invention.

As shown in FIG. 1, potable card reader device 22 that carried by home delivery service contractor can be connected with communication device 23 through by communication cable 25.

Also, communication line 35 includes telephone line, ISDN line, and Internet is connected with communication terminal 23 such as personal computer that is located at home delivery service shop B that is responsible for area B, server of the credit company performing the settlement 37, and server of the home delivery management at the home delivery contractor 39.

Moreover, server of the home delivery management at the home delivery contractor 39 contains a storage unit 87 that is stored freight information including address code, tracing code, money amount for merchandise, and merchandise classification. This freight information is from several home delivery pick up points from at all over the country.

On the other hand, server of the credit card company performing the settlement 37 located at credit company contains storage unit 73 that is stored credit inquiry information such as credit card number of card holder, expiration date, and address code as a database.

Moreover, portable credit card reader device 22 can connect to communication terminal 23 located at home delivery service shop B, and install credit card inquiry information from credit card company and freight information from home delivery contractor.

Figure 2:
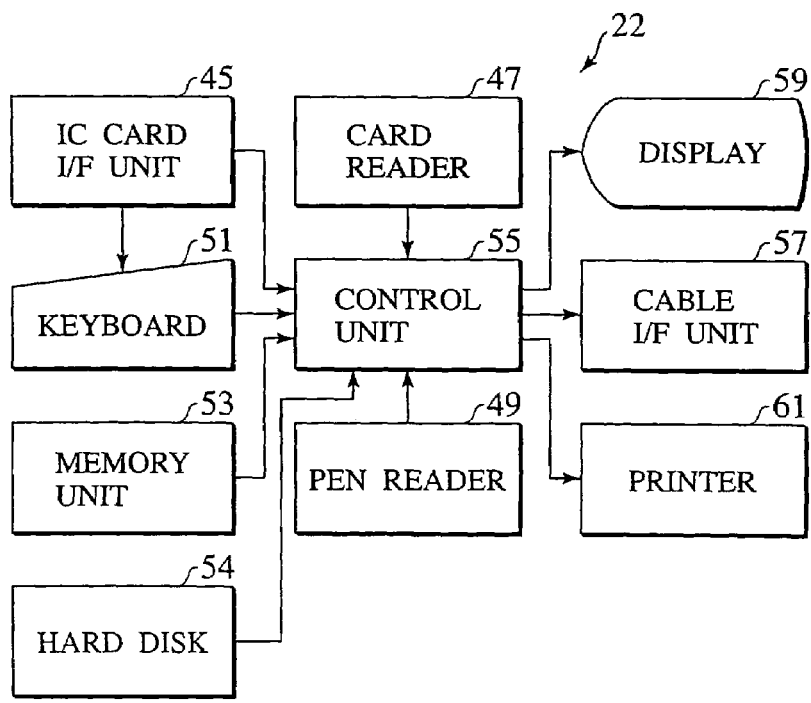
FIG. 2 is a view showing a structure of a portable card reader device 22.

Next step, as shown in FIG. 2, portable credit reader device 22 is composed of an IC card I/F (interface) unit 45, a card reader 47, a pen reader 49, a keyboard 51, a memory unit 53, a hard disk 54, a control unit 55, a cable I/F unit 57, a display 59, and a printer 61.

An IC card used for electronic money can be connected to the IC card I/F unit 45. The card reader 47 reads magnetic information recorded on a credit card, such as a card number, expiration date, the name of the credit card company and like. The pen reader 49 reads a tracing code out of a bar code written on a freight slip. The keyboard 51 inputs text information. The memory unit 53 includes an internal RAM for storing in advance terminal number unique to each portable reader device 22 and for storing control data.

The hard disk 54 is able to store freight information of each delivery and card information of each card. The control unit 55 includes an internal timer for clocking date and hour, and controls the respective units provided in the portable card reader device. The cable I/F unit 57 performs communication of information with the communication terminal through the communication cable 25. The display 59 displays inputted contents and messages. The printer 61 prints a receipt upon completion of settlement by card.

Then, a control program is read out the memory unit 53 into the control unit 55 by turning on a power switch (not shown) provided on the portable card reader device 22, and operation guidance screen is displayed on the display, for example. Accordingly, the home delivery contractor swipes a credit card through a credit card reader 47 to read the credit card data out, and the money amount for the merchandise representing the price for the merchandise, and the merchandise identification number are inputted with the keyboard 51. The address tracing code is read out of the bar code by use of the pen reader 49, and the credit card number is inputted with the keyboard 51.

Thereafter, the terminal identification number of the portable card reader device 22 being store in the memory unit 53 in advance read out, and credit card data such as the credit card number, the expiration date, and the money amount for the merchandise, the merchandise classification number, the tracing code, and the authentication number are formed into a batch of terminal collected information, and then the terminal collected information is transmitted from the cable I/F unit 57 to the communication terminal 23.

When credit card inquiry information has been made based on in advance installed plural credit card inquiry information by portable card reader device, printer 61 achieves the function of printing a receipt with the tracing code of merchandise, the credit card company, the money amount for the merchandise, method of payment, and number of payment.

Next, as shown in FIG. 3, a keyboard 51 set on portable card reader device 22 composed of [select] key PF1~PF5, [reprint] key, [paper feed] key, [light] key, [power] key, [mode key], [reset] key, [set] key, [settlement] key, [correction] key, and [number] key.

[Select] key PF1~PF5 performs choosing action mode that is a changeover to a display 59. [Reprint] key performs reprinting a transaction slip, total slip and like immediately before these printed. [Paper feed] key performs feeding paper out of a printer 61. [Light] key performs lighting up the display 59 and a key that inputted. [Power] key performs turning on/off the power when display shows a mode choice screen or input password display.

[Mode] key performs changing action mode. [Reset] key performs returning back to initial mode display. [Set] key is to complete inputting toward guidance screen of the display 59. [Settlement] key is to complete for series of operation. [Correction] key is to clear data immediately before inputted. [Number] key is to input number of payment for installment plan and like.

Next, as shown in FIG. 4, settlement server 37 at credit card company composed of plural communication processing units 63, a communication control unit 65, a control unit 71, a display control unit 64, a display unit 66, a keyboard 67, and a storage unit 73.

The communication processing units 63 perform communication of information among commination terminal 23 through communication lines 35. The communication control unit 65 controls the plurality of communication processing units 63. The control unit 71 includes an internal time for clocking date and hour, and control the respective units provided settlement server 37. The display 64 performs display on a display 66 the information from communication terminal 23 and information that stored at a storage unit 73. The keyboard performs inputting information in the control unit 71. The storage unit 73 stores information such as invalid credit card number as a blacklist, credit card number and expiration date as credit inquiry for each consumer, and account information of financial institution of each consumer as a database.

When the settlement server 37 at the credit card company receives access request from the communication terminal 23, the settlement server 37 send information, that is corresponding to plural address code that home delivery service shop B is responsible, such as credit inquiry information including blacklist out of database (not shown) through the communication line 35 to communication terminal 23.

Moreover, the settlement server receives settlement information from the communication terminal 23. The storage unit 73 at settlement server 37 stores the unique identification number, method of payment, the tracing code, the money amount for the merchandise, merchandise classification information, credit card number and expiration date are formed into a batch of terminal collected information as a delivered freight settlement consumer information of area that home delivery service shop B is responsible. Moreover, the settlement server 37 at credit card company research and extract consumer and credit card number out of settlement information, and charged amount as an installment plan and revolving plan payment into consumer's contracted financial institute account.

For information, revolving plan payment is a method to be charged fixed amount into the consumer's contracted bank account every month no matter how much the merchandise is.

Figures 5, 6:
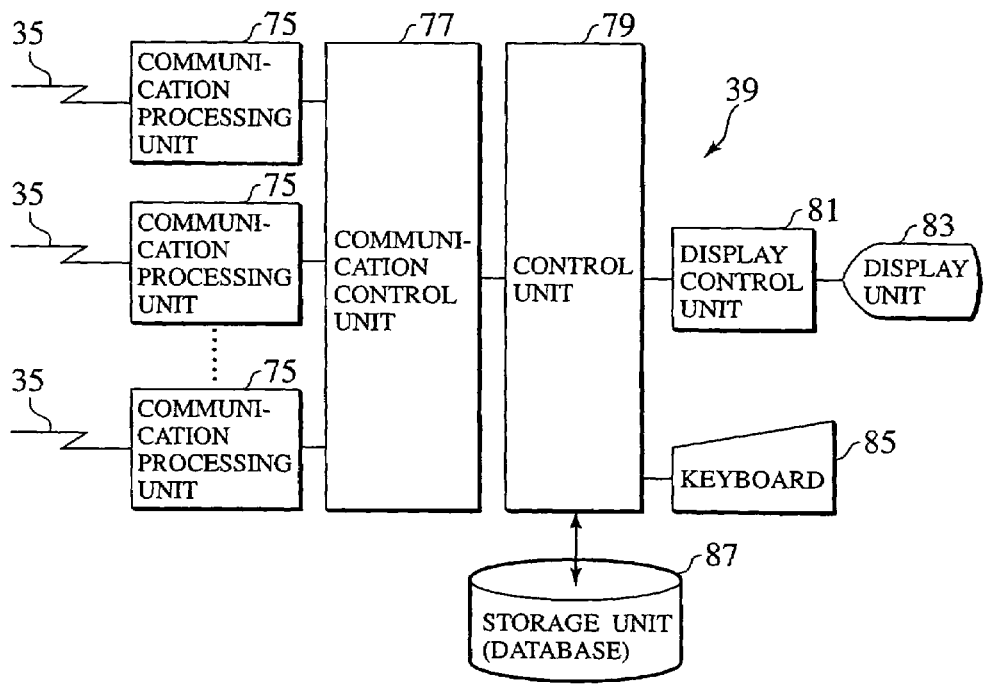
FIG. 5 is a view of the structure showing a home delivery management server 39 of the home delivery contractor.
FIG. 6 is a view of the structure showing database of storage in a storage unit 87 on the home delivery management server 39.

Next, as shown in FIG. 5, the home delivery management server 39 is composed of communication processing units 75, a communication control unit 77, a control unit 79, a display control unit 81, a display unit 83, a keyboard 85, and a storage unit 87.

The communication processing units 75 perform communication of information among commination terminal 23 through communication lines 35. The communication control unit 77 controls the plurality of communication processing units 75. The control unit 79 includes an internal time for clocking date and hour, and control the respective units provided settlement server 39. The display control unit 81 performs display on a display 83 the information from communication terminal 23 and information that stored at a storage unit 87. The display unit 83 displays information out of the display control unit 81. The keyboard 85 performs inputting. The storage unit 87 stores information such as transaction information, terminal information, and account information as a database.

Also, the database stored at the storage unit 87 includes; transaction information includes tracing code to show management number of the merchandise, money amount for merchandise, merchandise classification, and address code; card information such as credit card company information; terminal information such as terminal identification number of portable card reader device carried by home delivery service contractor; and account information such as transaction content and credited amount as shown in FIG. 6.

The home delivery management server 39 at home delivery contractor stores freight information from plural home delivery pickup point all over the country such as address code, tracing code, money amount for merchandise, and merchandise classification at the storage unit 87 as a database.

When the home delivery management server 39 receives access request from the communication terminal 23, the settlement server 39 send information, that is corresponding to plural address code that home delivery service shop B is responsible, out of database in the storage unit 87 through the communication line 35 to communication terminal 23.

Moreover, the home delivery management server 39 receives settlement information from the communication terminal 23 and stores the unique identification number, method of payment, the tracing code, the money amount for the merchandise, the merchandise classification information, the credit card number and expiration date are formed into a batch of terminal collected information as a delivered freight settlement consumer information of area that home delivery service shop B is responsible.

Moreover, the home delivery management server 39 confirms whether the freight has been delivered to the consumer based on tracing code out of settlement information, and after that, sends an account information out of settlement information to the settlement server 37 at credit card company for claiming delivery commission.

Figure 7:
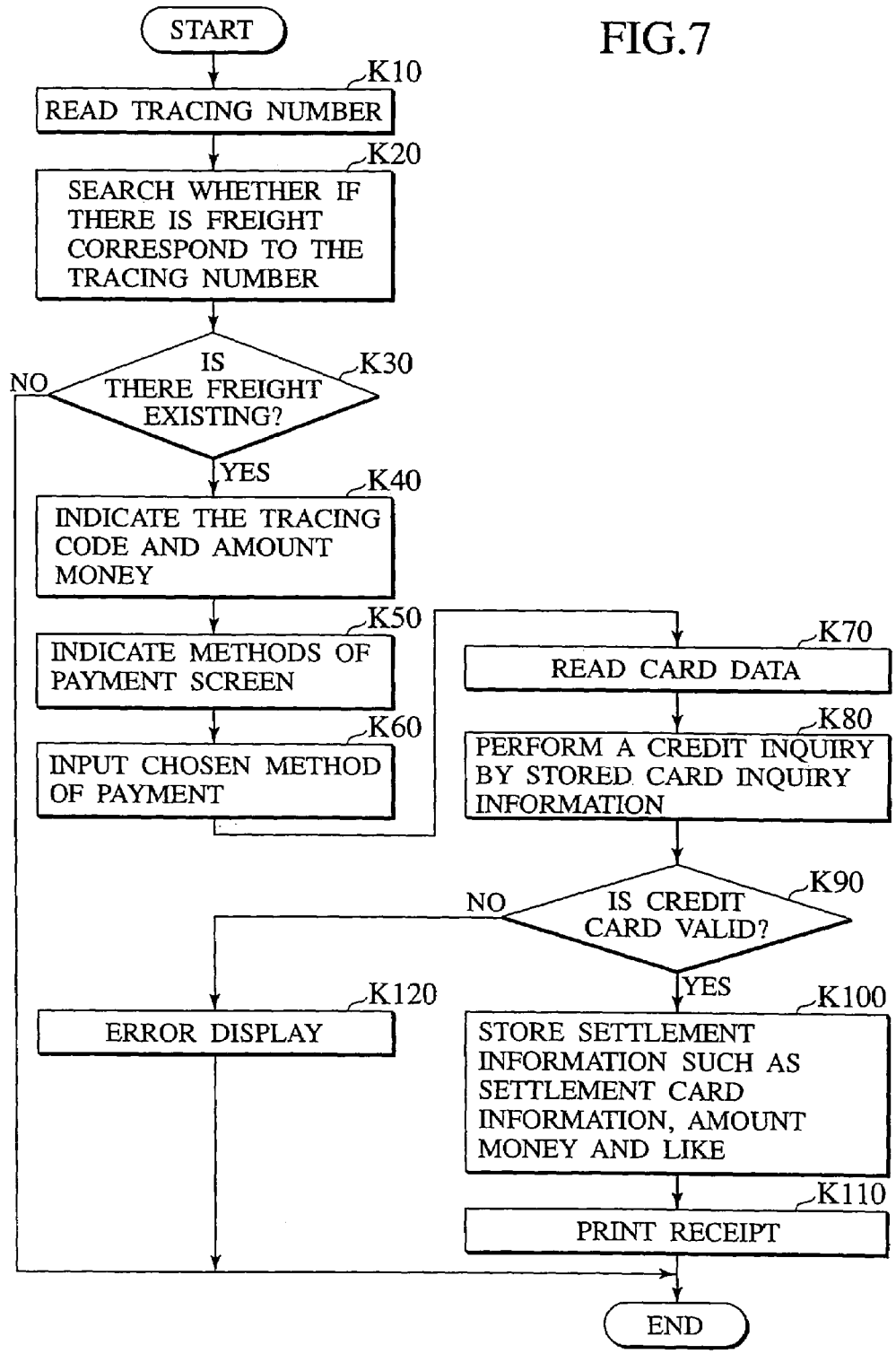
FIG. 7 is a flowchart showing an operation of the credit card reader device 22.

Next, description will be made regarding operation of the pay-by-card system for a home delivery service according to the first embodiment of the present invention with reference to flowchart shown in FIG. 7 and sequence shown in FIG. 8. Note that the flowchart of the portable card reader device shown in FIG. 7 is stored in the control unit 55 as a program.

(1) Sequence on Pickup

A home delivery service contractor needs to make contracts with plural credit card companies for a membership in advance. Also, home delivery contractor need to make merchandise price collection consignment contract for home delivery contracts with corporative or private sellers for surrogate money collection business for merchandise. Now, for example, the consumer specifies and orders with the seller the merchandise that the consumer wishes to purchase, the merchandise seller makes a request to the home delivery contractor with whom the merchandise seller has entered into the merchandise price collection consignment contract for home delivery, to deliver the ordered merchandise to the home of the consumer. To put it concretely, the home delivery contractor confirm the delivery address on the freight slip on merchandise, and write the address code specified by delivery address beforehand. Then read bar code that shows written in advance tracing code on the freight slip by PDT (Portable Data Terminal), input address code, amount money for the merchandise and merchandise classification, and collect merchandise from merchandise seller to home delivery pickup point A.

At the home delivery pickup point, sort merchandise according to the address code on the freight slip and load a track heading to home delivery service shop B. At the same time, connect portable terminal PDT with a communication terminal at home delivery pickup point, and transfer the freight information including address code corresponding to each collected plural of merchandise, tracing code, amount money for the merchandise and merchandise classification to the communication terminal.

As a result, the home delivery management server 39 stores freight information from home delivery pickup point all over the country such as address code, tracing code, amount money for the merchandise and merchandise classification at the storage unit 87 as a database.

After the truck loading the merchandise arriving at home delivery service shop B, again, the merchandise is reloaded into another track that is responsible for delivery area.

Figure 8:
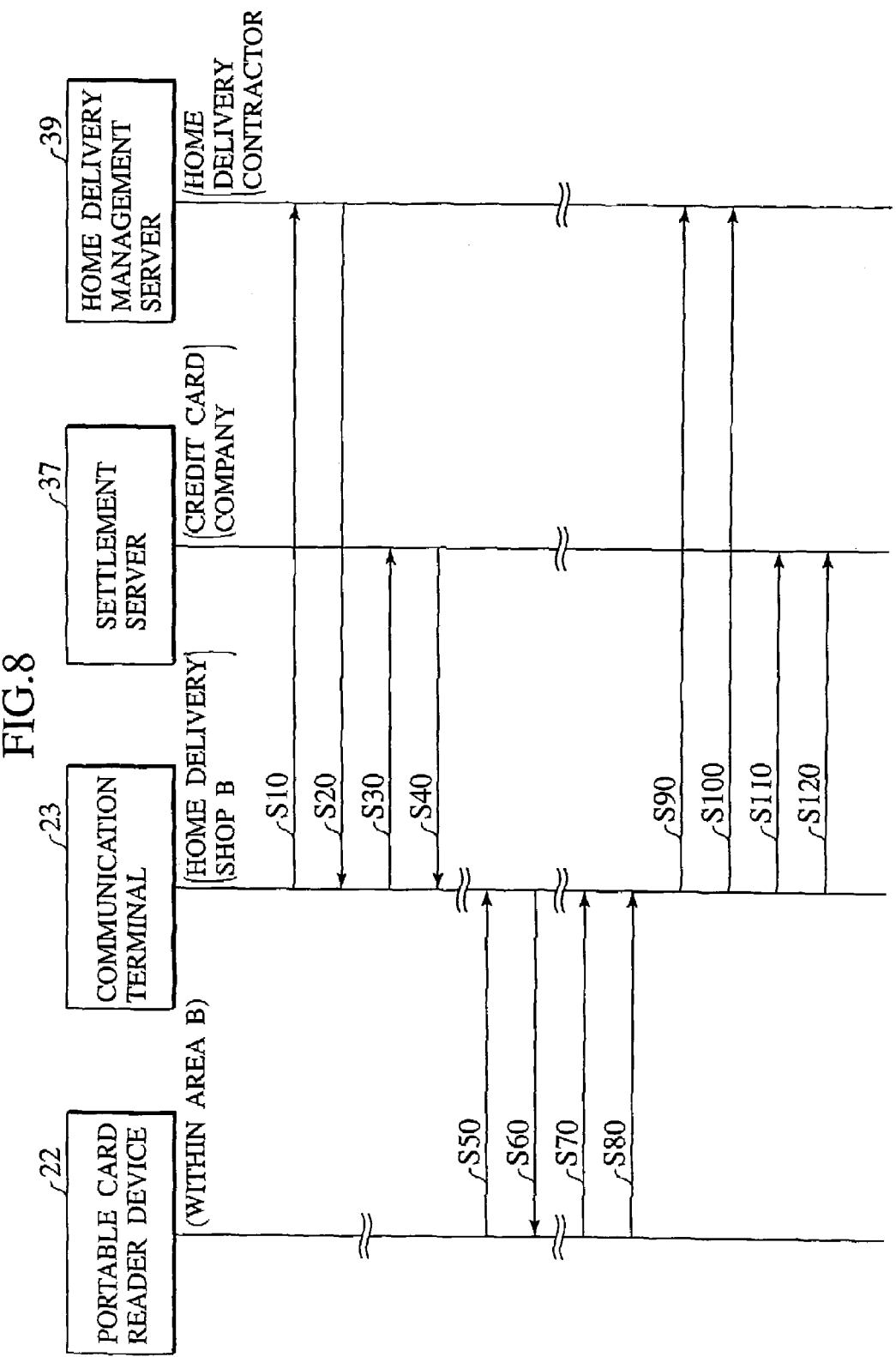
FIG. 8 is a sequence chart showing exchanging information between each device to settle of the card account.

Then, as shown in FIG. 8, the communication terminal 23 at home delivery service shop B obtains freight information and credit inquiry information of delivery area.

Videlicet, in sequence S10, the communication terminal 23 send obtaining freight information with address code of delivery area to the home delivery management server 39 at home delivery contractor through the communication line 35.

In sequence S20, the home delivery management server 39 receiving access request from the communication terminal 23 reads freight information corresponding to plural address code of home delivery service shop B's delivery area out of the storage unit 87, and send that from the communication processing unit 75 to the communication terminal 23 through the communication line 35. As a result, freight information of delivery area of home delivery service shop B is stored at hard disk (not shown) on the communication terminal 23.

In sequence S30, the communication line 23 sends obtaining freight information with address code of delivery area to the settlement server 37 at credit card company through the communication line 35.

In sequence S40, the settlement server 37 that receiving the access request from the communication terminal 23 read credit inquiry information corresponding to plural address code of home delivery service shop B's delivery area out of the database (not shown), and send that to the communication terminal 23 through the communication line 35.

As a result, credit inquiry information such as credit company black list, card number, and expiration date of credit card holder existing certain area within home delivery service shop B delivery area is stored at hard disk (not shown) on the communication terminal 23. Moreover, the printer 24 connected with the communication terminal 23 print out delivery list of merchandise regarding to each designated track depending on the delivery area.

(2) Sequence for Delivery Preparation

Next, Connect the communication terminal 23 at the home delivery service shop and the portable card reader device 22 through the communication cable 25, and in sequence S50, send the access request with address code of specified responsible delivery area only to the communication terminal 23 through the communication cable 25 to obtain freight information and credit inquiry of said portable card reader device delivery area In sequence S60, the communication terminal 23 that receiving access request from the portable card reader device 22 read freight information and credit inquiry information corresponding to address code of access request out of database of the communication terminal 23, and send to the portable card reader device 22. As a result, freight information and credit inquiry information of specified delivery area stores at a hard disk 54 on the portable card reader device 22.

(3) Portable Card Reader Device Performance on Delivery

The delivery man who is responsible for one of specified area of plurality of delivery area of home delivery service shop B reloads designated merchandise addressed to said delivery area into a track, and he/she carries the portable card reader devices that stored the freight information and the credit inquiry information of said delivery area. And he/she drives to the receiver's address referring to the delivery list.

Then the delivery man delivers the merchandise, and the consumer gives credit card to him/her.

The detail of the performance of the portable card reader device 22 and sequence of delivery will be explained as below referring to FIG. 7 flowchart.

In the step K10, the home delivery contractor reads the tracing code of the merchandise out of the bar code written on the part of the tag by use of the pen reader 49. And this tracing code is temporarily stored from the control unit 55 into the internal RAM of the memory unit 53.

In the step K20, search whether there is correspond tracing code to the said tracing code among plural freight information stored at the hard disk 54.

Now, in the step K30, judge either whether there is corresponded tracing code at the hard disk 54 at step K20, and whether there is, go to step K40. On the other hand, whether there is not stored the tracing code of freight, all performance comes to the end.

In the step K40, read the amount money for the merchandise and merchandise classification of said correspond tracing code among plurality of freight information stored at the hard disk 54, and display on the display 59. As a result, merchandise classification, slip number showing tracing code, amount price for merchandise are displayed on the indication screen 91A on the display 59 in FIG. 9 (A). At the same time, [press set key] is shown as guidance information.

Figure 9:
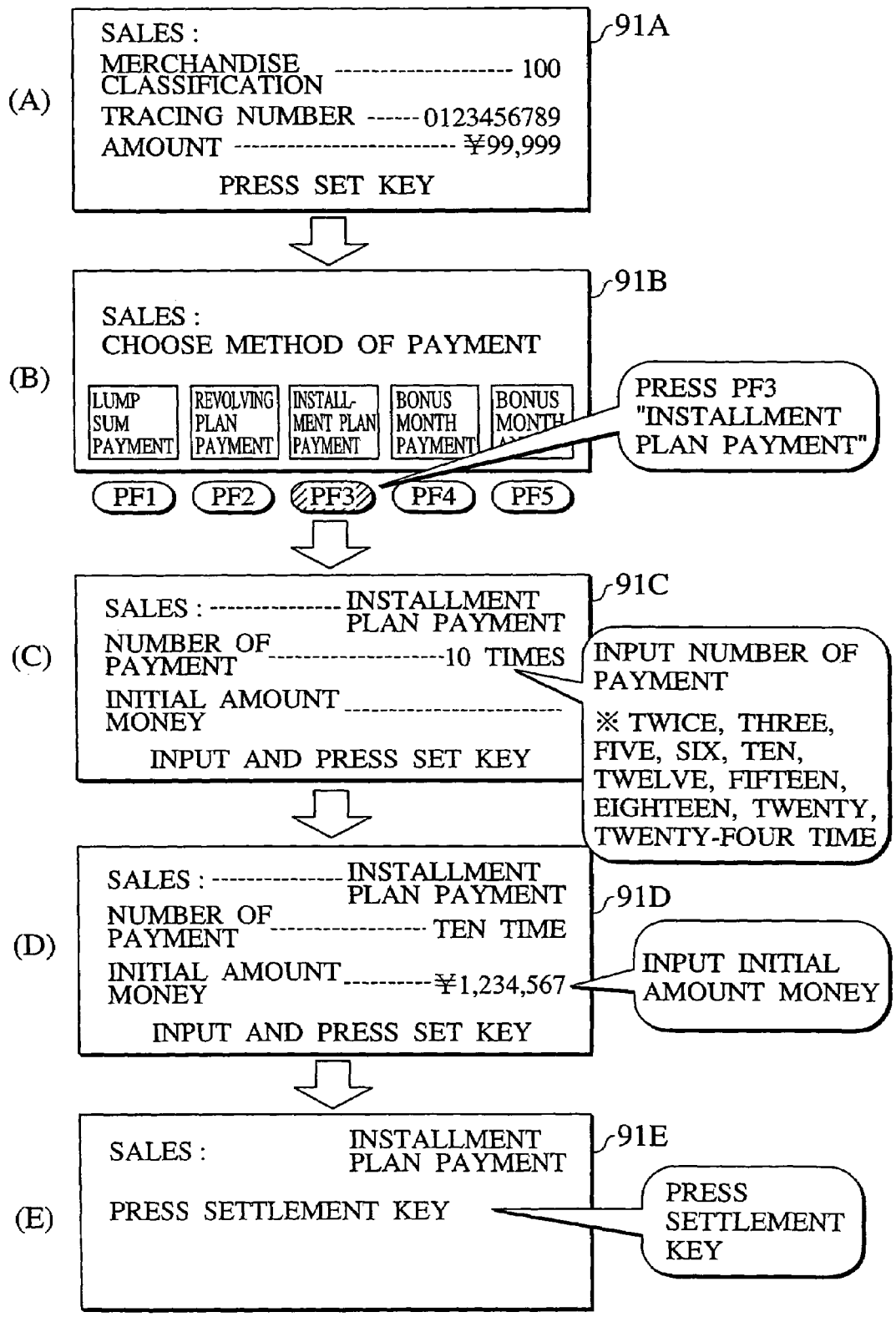
FIG. 9 is view (A)~(E) showing a change on indicated indication screen on a display 59.

Then, in the step K50, when home delivery contractor presses [set] key on the keyboard 51, method of the payment such as a lump-sum payment, revolving payment, installment plan payment, bonus month payment, bonus month and installment plan payment will be displayed on the indication screen 91B on the display 59 in FIG. 9 (B), and the same time, guidance information [choose the method of the payment] will be indicated to make consumer choose method of payment from payment plans. Then, assuming that the home delivery contractor asks consumer the method of the payment and the consumer answers the choice of method of the payment.

In the step K60, one of the methods of the payment on the display 59 has been chosen and inputted it by pressing [select] key on the keyboard 51. In the addition, owing to circumstances to explain this system, assuming the consumer answer home delivery contractor and home delivery contractor chooses and presses [installment payment plan] key.

When home delivery contractor presses the PF3 key on the keyboard 51, input screen is displayed on the indication screen 91C on the display 59 in FIG. 9 (C). Then assuming that the home delivery contractor asks consumer for number of the installment payment, for example, if [ten times] is the consumers answer, and then home delivery contractor input it by pressing [number] key on the keyboard 51. Moreover, assuming that the home delivery contractor asks the initial amount of money of the installment plan payment, as shown in FIG. 9 (D), and inputs the initial amount of money of the installment plan payment [1234567] as a corresponding consumer's answer by pressing the [number] key on the display 51 for example.

Next, as shown in FIG. 9 (E), displayed [press the settlement key] as guidance information, and makes the home delivery contractor choose pressing settlement key. When the home delivery contractor presses the [settlement] key on the keyboard 51, go for next step K70.

In the step K70, the card reader 47 reads credit card information, such as card number, expiration date and like, that is recorded on the card 20 to identify the member, and terminal identification number, method of the payment, tracing code, amount money for the merchandise, merchandise classification, card number, expiration date and like are temporarily stored from the control unit 55 into the internal RAM of the memory unit 53.

In the step K80, in order to check credit inquiry whether the plurality of credit inquiry stored at portable card reader device 22, the control unit 55 searches whether there is credit card number coincide with plurality of consumers' credit inquiry including credit card number, expiration date stored at hard disk 54. And also, judge whether the consumer still make a contract with the credit card company of said credit card and either whether it is still valid credit card or not. Then, the control unit 55 makes verification information including valid credit card information for use when the credit card contract is valid, and on the other hand, the control unit 55 makes verification information (result of credit standing inquiry) including invalid credit card information when the credit card contract regarding to the consumer is not valid. In addition, in credit inquiry operation in the step K80, the control unit 55 makes invalid credit card information to avoid accepting invalid credit card when the credit card number of the consumer and credit inquiry information including the appointed credit card number of plurality of black list matches.

Now, in the step K90, check based on the verification information whether this credit card company is valid or not. Thus, in the case the verification information contains valid credit card information, the credit card company is available, so go on the step K100. On the contrary, when verification information contains invalid credit card information, the credit card company is unavailable, so go on step K120.

When credit card company is available, in the step K100, the control unit 55 performs the information temporally stored at the internal RAM of the memory unit 53 such as terminal identification number, method of payment, tracing code, the amount money for merchandise, merchandise classification, credit card number, and like forming into a batch of terminal collected information regarding to the merchandise as the settlement information from the control unit 55 to the hard disk 54.

Then, in the step K110, control unit 55 performs reading tracing code, credit card company, amount money for merchandise, method of payment, number of installment plan payment, and like out of the memory unit 53, adding the day and time for delivery from a timer, making receipt information showing the settlement of the merchandise is done, and inputting receipt information to the printer 61 to print out the receipt.

As a result, as shown in FIG. 10, the printer 61 prints out credit card sales slip 93 as a receipt. There are payment classification showing method of payment, number of the payment for the installment plan payment, merchandise classification, slip number showing tracing code, amount money for merchandise, signature section, and like recorded on the credit card sales slip 93.

At the same time, the operation of the portable card reader device 22 ends. The printed receipt is torn from the printer 61 by home delivery contractor and handed in to the consumer.

Meanwhile, when the credit card company is unavailable, the control unit 55 read message [This credit card company is unavailable] out of the memory unit 53, and indicates error display on the display 59. At the same time, the control unit 55 deletes credit card information temporally stored at the internal RAM of the memory unit 53such as consumer's credit card number, expiration date, and complete the operations As explained above, the portable card reader device 22 performs including method for performing settlement of merchandise by the portable card reader device performs storing credit inquiry and freight information regarding to plurality of consumers who exist within certain delivery area at the hard disk 54, reading out card information of the settlement credit card for settlement by the card reader 47 and inputting the method of the payment by keyboard 51 when the merchandise is handed to the consumer, performing settlement at the control unit 55 based on the stored credit inquiry of the plurality of consumers and read out credit inquiry information for settlement, and settling the amount money for the merchandise included in the freight information when the settlement information is valid as a credit inquiry result to settle the amount money for merchandise delivered by the home delivery contractor.

Moreover, the receipt that shows the payment for merchandise is settled can be printed out from the printer 61 depends on the credit inquiry and can be handed in to the consumer, so it is able to settle the payment by credit card for delivered merchandise.

Moreover, the printer 61 can print the method of payment on the receipt when the method of payment among a lump-sum payment, installment plan payment, revolving plan payment is chosen and inputted by the keyboard 51, therefore it is able to settle the payment by either method of payment.

Moreover, the printer 61 can print out number of the payment on the receipt when installment plan payment or revolving plan payment is chosen, therefore consumer can confirm the number of payment.

Moreover, when the control unit 55 performs credit inquiry based on the credit inquiry information stored at the hard disk 54 including black list listing unaccepted credit card numbers, whether the credit card inquiry information including the black list listing unaccepted credit card numbers and the credit card number of the consumer matches, invalid information for using the card to not to accept the credit card is made, therefore it can be prevented fraudulent use by a delinquent cardholder. As a result, the consumer who ordered merchandise enjoy convenience and security by using credit card to settle the payment without having cash in advance for the merchandise that will be delivered.

(4) Total Up Operation After Delivery

Figure 11:
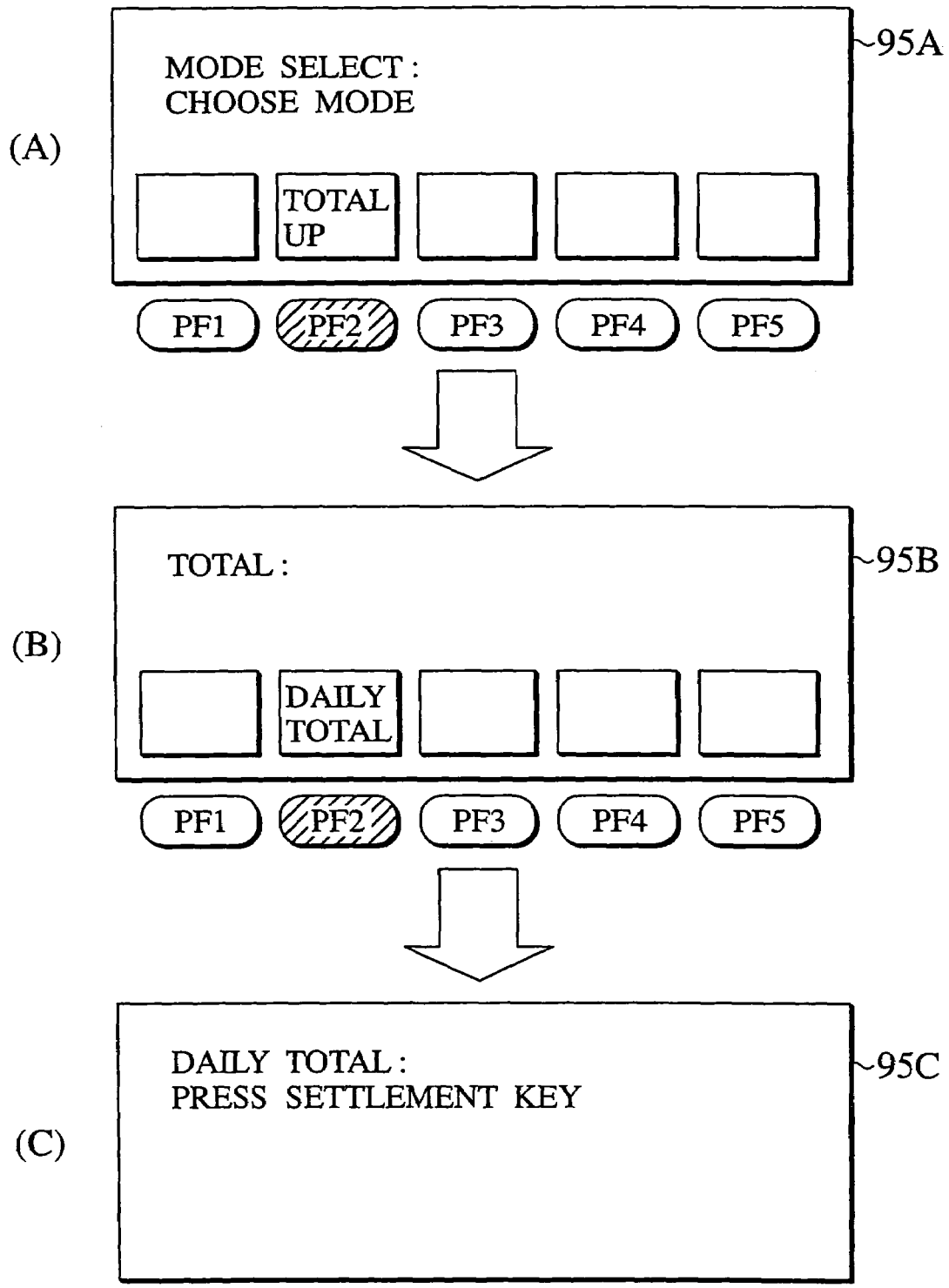
FIG. 11 is view (A)~(C) showing a change on the indication screen on the display 59.

When the home delivery contractor presses the [mode] key on the key board 51, [total up] mode is indicated above [select] key as a one of the mode choice screen on the indication screen 95A on the display 59 in FIG. 11(A), and the same time, [choose mode] is displayed as a guidance information to make choice among these items. Then, assuming that the home delivery contractor chooses PF2 [total up] key for explanation reason.

When the home delivery contractor chooses PF2 [total up] key on the keyboard 51, input display regarding to [total up] is shown on the indication screen 95 on the display 59 in the FIG. 11(B). The indication screen 95B on the display 59 in FIG. 11(B) indicates [daily total] existing above [select] key as one of total up items to make one choice out of these items. Assuming that the home delivery contractor chooses PF2 [daily total] at that time for the explanation of this system.

In case the home delivery contractor presses the PF2 key on the keyboard 51, input display regarding to [daily total] is indicated on the indication screen 95C on the display 59 in FIG. 11(C).

Next, as shown in FIG. 11(C), as guidance information, [presses settlement key] is indicated to make a choice [daily total]. When the home delivery contractor input [settlement] key on the keyboard 51, the control unit 55 performs daily total operation.

Thus, the control unit 55 performs reading stored settlement information in due order out of the hard disk 54, adding up total number and total amount money of each a lump-sum payment, installment plan payment, and revolving payment as a daily total list regarding to plural consumer who used credit card to settle the payment for the merchandise, and printing the daily list 97 out of the printer 61.

As a result, as shown in FIG. 12, the daily total list 97 I sprinted out of the printer 61. Especially, the daily total list 97 is printed that adding up total number and total amount money separated by the method of payment of each a lump-sum payment, installment plan payment, and revolving payment, and therefore, it is able to check the sales of the day referring to the daily total list.

(5) Sequence After Completing Delivery

After completing delivery, after the truck arriving at the home delivery service shop B, the communication terminal 23 at the home delivery service shop and the portable card reader device 23 will be connected through the communication cable 25. In the sequence S70, sending transferring request to the communication terminal 23 in order to transfer settlement information stored at the hard disk 54 at the concerned portable card reader device 22.

The communication terminal 23, that receives transferring request from the concerned portable card reader 22, sends confirmation information to the concerned portable card reader device 22.

In the sequence S80, the portable card reader device 22, that receives confirmation information from the communication terminal 23, transfers settlement information stored at the hard disk 54 to the communication terminal 23. Then, the concerned portable card reader device 22 deletes settlement information stored at the hard disk 54 after transferring settlement information to the communication terminal 23. Therefore, the credit card number being temporally stored at the hard disk 54 is deleted, and it is possible to prevent leakage of the important personal information such as credit card number of the consumer.

As a result, the hard disk (not shown) at the communication terminal 23 stores terminal identification number, method of payment, tracing code, the amount money for merchandise, merchandise classification, credit card number, and like forming into a batch of terminal collected information regarding to the settlement information of the merchandise which delivered.

In this way, in the portable card reader device 22 delete the settlement information stored at the hard disk 54 after transferring the settlement information stored at the hard disk 54 to the communication terminal 23, and it is possible to prevent leakage of the important personal information such as credit card number of the consumer.

(6) Transferring Sequence of Settlement Information

In the sequence S90, in order to transfer the settlement information regarding to the freight to the home delivery management server 39 at the home delivery contractor, the communication terminal 23 sends transferring request to the home delivery management server 39 at the home delivery contractor through the communication line 35. The home delivery management server 39 at the home delivery contractor receiving the settlement request from the communication terminal 23, and send the confirmation information to the communication terminal 23.

In the sequence S100, the communication terminal 23 receiving the confirmation information from the home delivery management server 39 at the home delivery contractor transfers the settlement information stored at hard disk (not shown) at the communication terminal 23 to the home delivery management server 39.

As a result, the storage unit 87 at the home delivery management server 39 stores terminal identification number, method of payment, tracing code, the amount money for merchandise, merchandise classification, credit card number, and like forming into a batch of terminal collected information regarding to the settlement information of the merchandise which delivered.

Moreover, in the sequence S110, in order to transfer the settlement information regarding to the freight to the settlement server 37 at the credit card company, the communication terminal 23 sends transferring request to the settlement server 37 at the credit card company through the communication line 35.

The settlement server 37 at the credit card company receiving the settlement request from the communication terminal 23, and send the confirmation information to the communication terminal 23.

In the sequence S120, communication terminal 23 receiving the confirmation information from the settlement server 37 at the credit card company transfers the settlement information stored at hard disk (not shown) at the communication terminal 23 to the settlement server 37 at the credit card company.

As a result, the memory unit 73 at to the settlement server 37 stores terminal identification number, method of payment, tracing code, the amount money for merchandise, merchandise classification, credit card number, and like forming into a batch of terminal collected information regarding to the settlement information of the merchandise which delivered within delivery area of home delivery shop B.

Accordingly, the settlement server 37 at the credit card company can performs extracting the consumer who holds the credit card based in the settlement information including credit card number, specifying amount money of the installment plan or revolving plan every month and charging the directly to financial institution that the consumer makes a contract based on the amount money of the merchandise and method of the payment.

Moreover, the home delivery management server 39 at the home delivery contractor can performs checking whether the merchandise is delivered to the consumer based on the settlement information including tracing code, making billing information to charge the delivery commission for credit card company, and sending it to the settlement server 37 at the credit card company.

In this way, when the merchandise is handed and to the consumer and payment is settled, the portable card reader device 22 can performs storing credit inquiry and freight information regarding to plurality of consumers who exist within certain delivery area as a settlement information at the hard disk 54, sending the stored settlement information to the communication terminal 23 at the home delivery service shop, and which transferring received settlement information, that is from the portable card reader device 22, to the settlement server 37 at the credit card company and the home delivery management server 39 at the home delivery contractor through the communication line 35, then it is possible to extract the consumer, who is holding this credit card, based on the settlement information including credit card number at the settlement server 37 at the credit card company, and it is possible to charge the amount for the installment plan payment every month or set amount for the revolving payment to the financial institute account that the consumer has a contract. Moreover, it is possible to check whether the freight reaches to the consumer based on the tracing code included at settlement information at the home delivery management server 39 at the home delivery contractor, and more, billing information for charging delivery fee is made from settlement information and send to the settlement server 37 at the credit card company.

Figure 13:
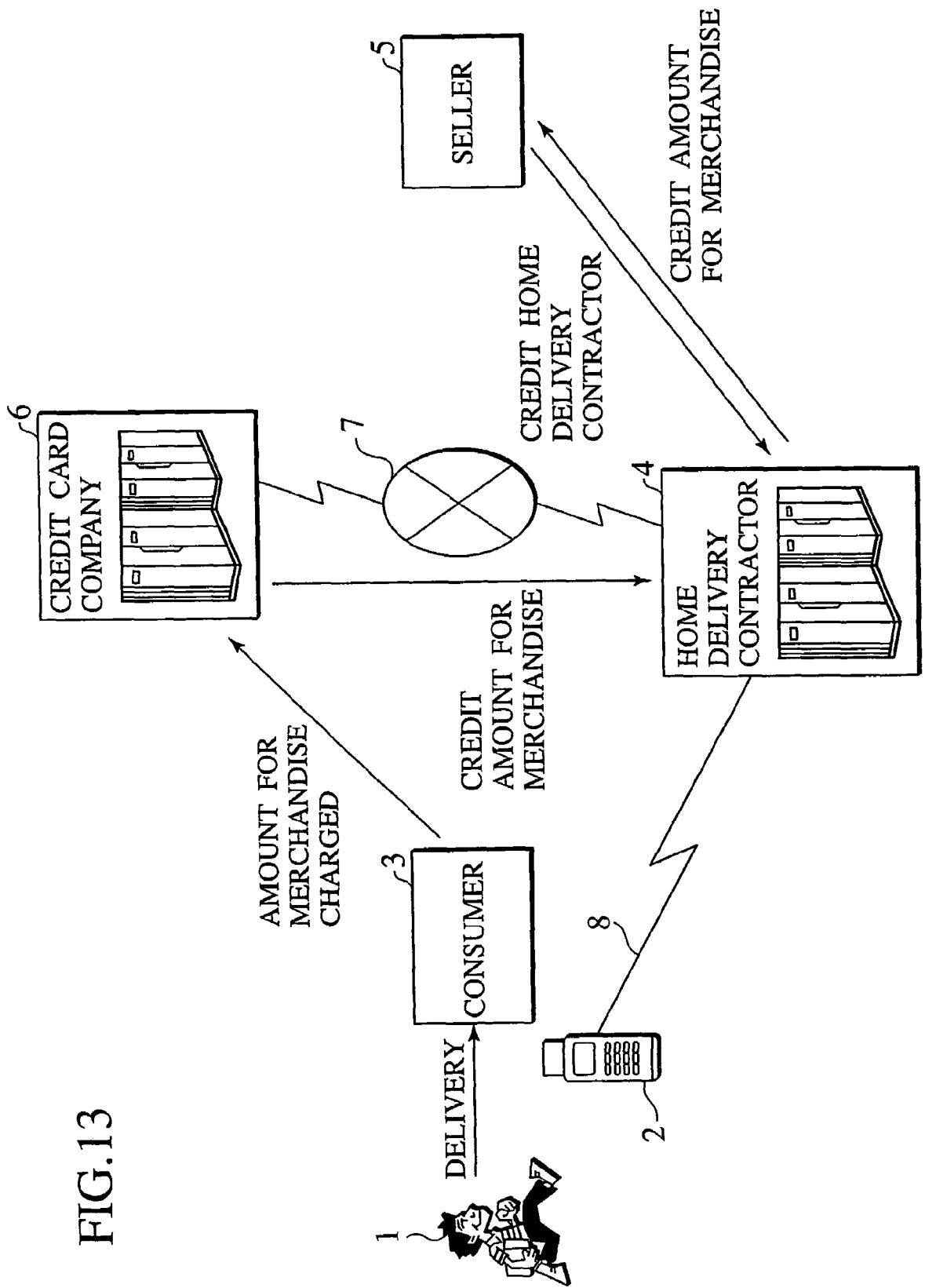
FIG. 13 is a view showing a pay-by-card system for a home delivery service according to the second embodiment of present invention.
Figure 14:
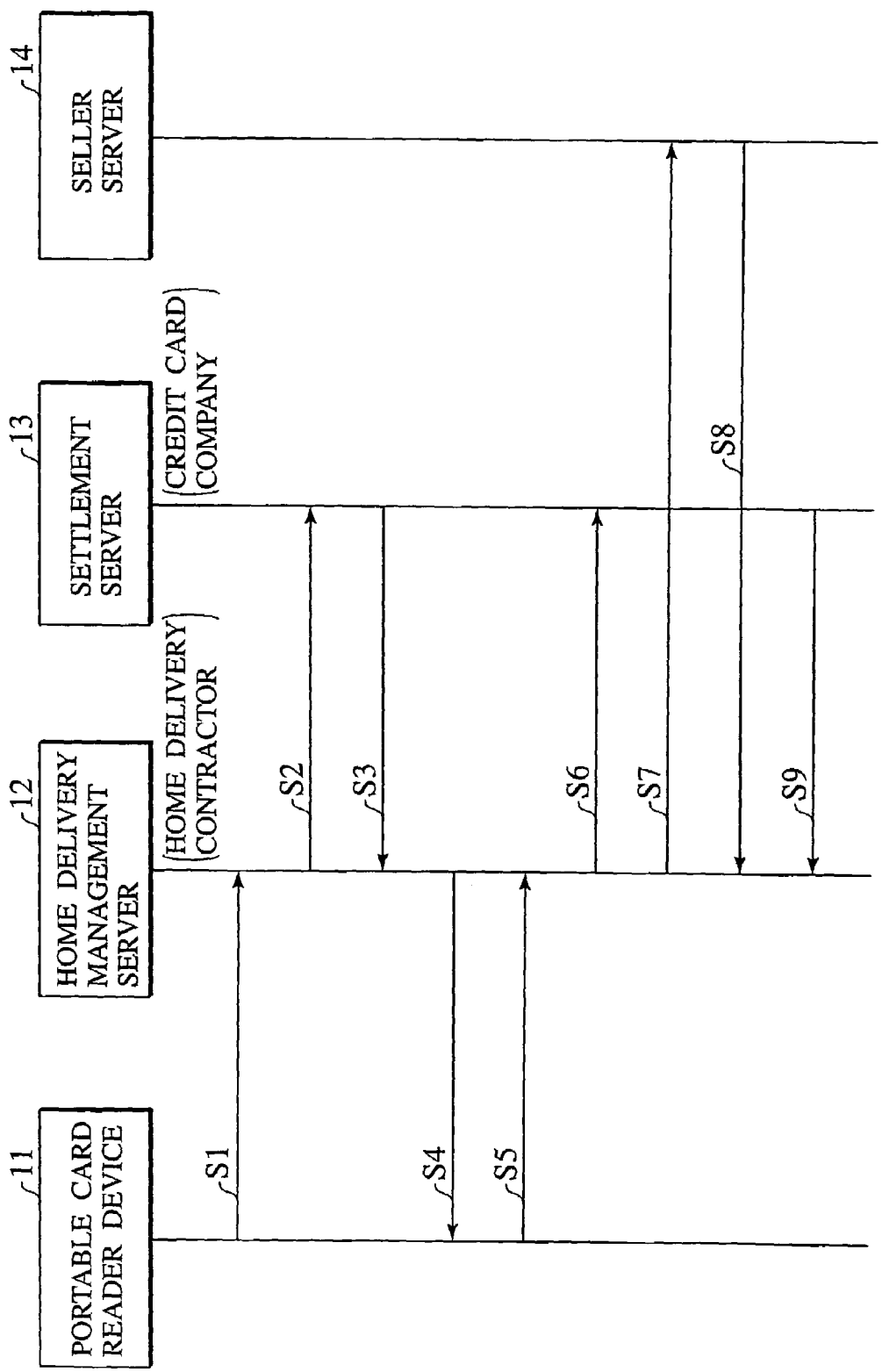
FIG. 14 is a sequence chart showing exchanging information between each device to settle of the card account according to the second embodiment of present invention.

Next, the second embodiment of the present invention will be described below. As shown in FIG. 13, this shows a business relationship between a consumer 3, a home delivery contractor 4, a seller 5, and credit card company 6 that issued the credit card for the settlement when consumer buy a merchandise on the Internet shopping and settle the payment by the credit card.

When the consumer 3 make an order, the seller 5 make a request (by a network) that the home delivery contractor 4 to deliver the ordered merchandise to the consumer 3. The delivery man 1 of the home delivery contractor carries portable card reader device 2, and delivers the ordered merchandise to the consumer 3. The delivery man 1 of the home delivery contractor sweeps the credit card of the consumer to the portable card reader device 2 and read the card information. The read credit card information and like are sent from the portable card reader 2 to the home delivery management server 4 at home delivery contractor through a wireless communication line 8 (charged by the weight?). The read credit card information and like are sent from the home delivery management server 4 at home delivery contractor to the settlement server 6 at the credit card company through an exclusive communication line 7. This home delivery management server covers all over the country. The credit inquiry information is sent from the settlement server 6 at the credit card company to the portable card reader 2 through both the exclusive communication line 7 and the wireless communication line 8. When the credit inquiry information (an invalid credit card numbers) is valid (Okay to use: the credit card number for the settlement and the invalid credit card number doesn't match) for the credit card for the settlement, the settlement procedure goes on a next step. The money flow of the credit card settlement procedure is as follows.

First, the seller 5 receives (by the network) the amount money for the merchandise from the home delivery contractor. On the other hand, home delivery contractor 4 receives (by the network) merchandise delivery service charge (shipping charge) from the seller 5. At that time, the procedure that the home delivery contractor 4 receives delivery charge from the seller 5 is not necessary when they have a contract to charge the amount that subtracted delivery charge from amount money for the merchandise between home delivery contractor 4 and the seller 5.

Next, the amount money for the merchandise is charged to bank account and like of consumer on the specified date according to payment regulation of the credit card company 6. Then the home delivery contractor 4 receives the charged money for the merchandise from credit card company. The settlement procedure is done like this.

Additionally, amount money for merchandise may contains either consumption tax or not, and either delivery charge or not.

The detail of procedure described above will be described below with reference of the FIG. 14~FIG. 17.

Figure 15:
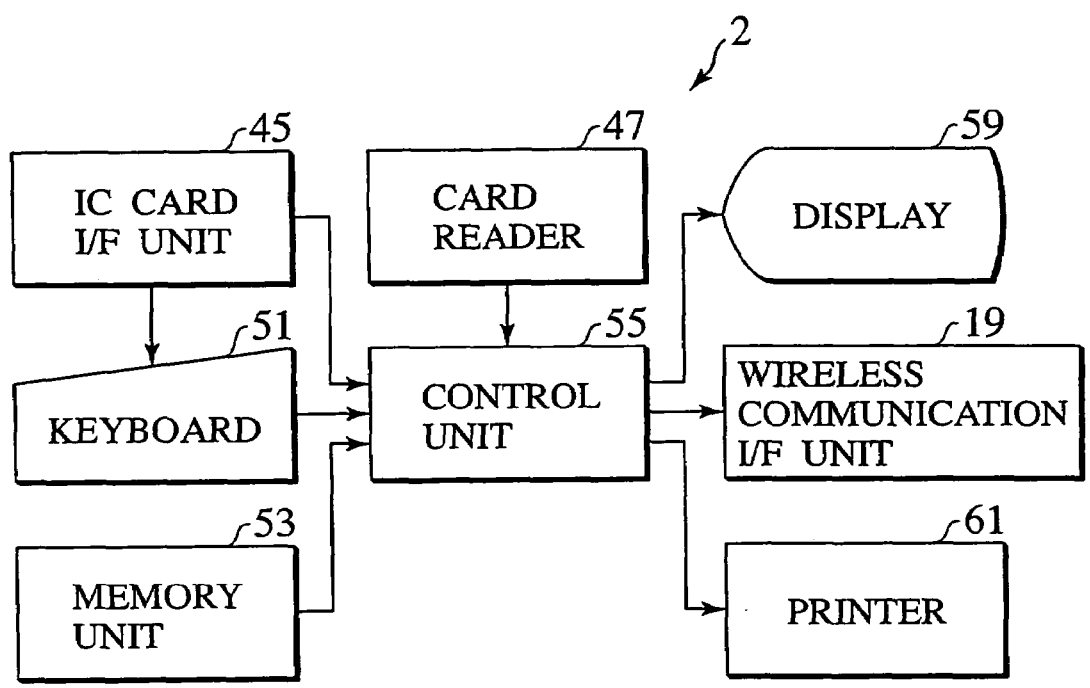
FIG. 15 is a view showing a structure of a portable card reader device according to the second embodiment of present invention.
Figure 16:
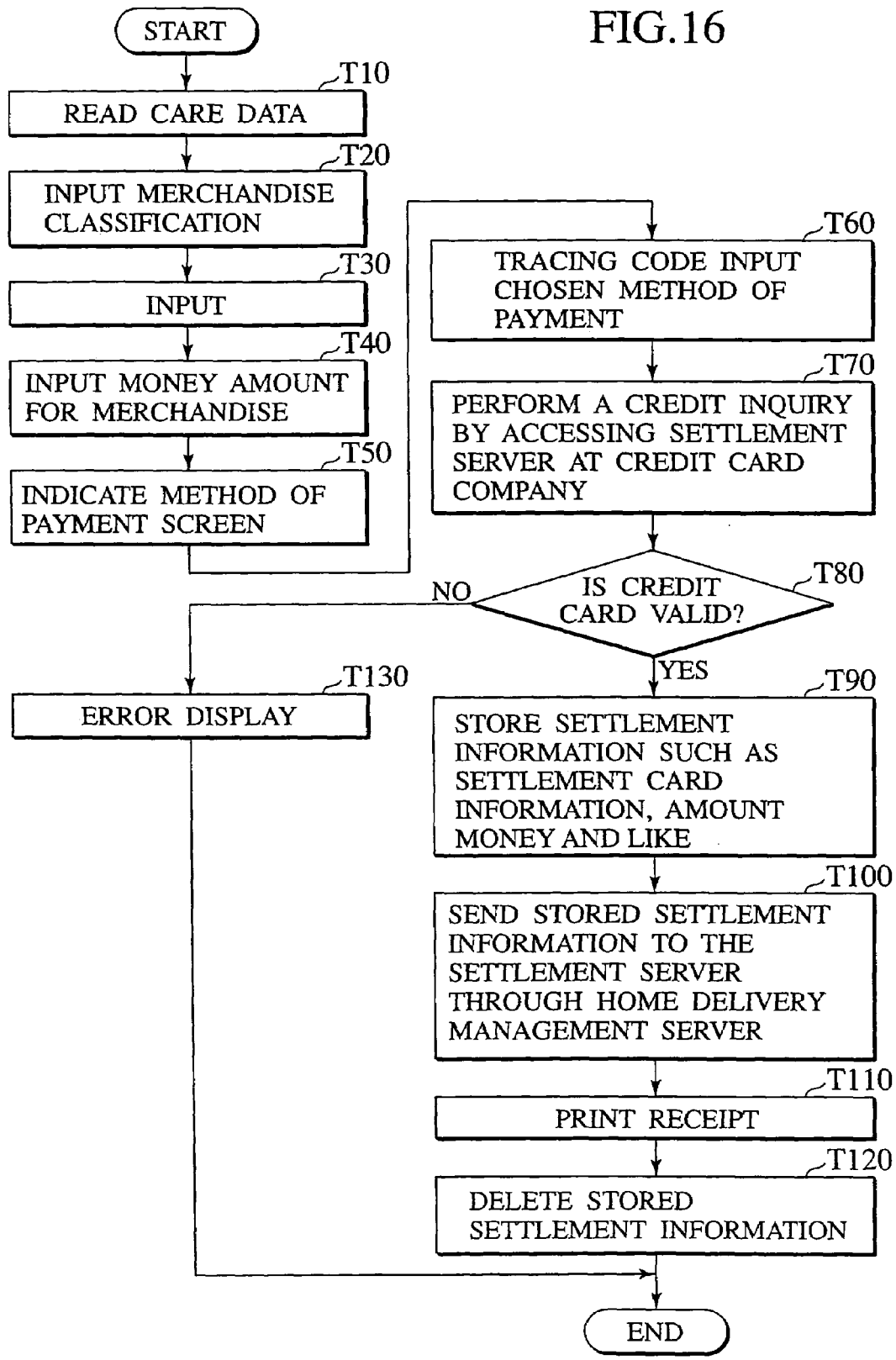
FIG. 16 is a flowchart showing an operation of a credit card reader device 11.

As shown in FIG. 15, the portable credit reader device 2 is composed of an IC card I/F (interface) unit 45, a card reader 47, a keyboard 51, a memory unit 53, a control unit 55, a wireless communication I/F unit 19, a display 59, and a printer 61.

An IC card used for electronic money can be connected to the IC card I/F unit 45. The card reader 47 reads magnetic information recorded on a credit card, such as a card number, expiration date, the name of the credit card company and like. The keyboard 51 inputs text information. The memory unit 53 performs storing in advance terminal number unique to each portable reader device 22, information inputted by the keyboard 51, and information received through wireless communication line 8. Also, the memory unit 53 includes an internal RAM for storing control data.

The control unit 55 includes an internal timer for clocking date and hour, and controls the respective units provided in the portable card reader device. The wireless communication I/F unit 19 performs communication of information with the home delivery management server 4 through the wireless communication line 8. The display 59 displays inputted contents and messages. The printer 61 prints a receipt upon completion of settlement by card.

Then, a control program is read out the memory unit 53 into the control unit 55 by turning on a power switch (not shown) provided on the portable card reader device 2, and operation guidance screen is displayed on the display 59. Accordingly, the home delivery contractor swipes a credit card through a credit card reader 47 to read the credit card data out, and the money amount for the merchandise representing the price for the merchandise, the merchandise identification number, tracing code, and method of payment are inputted with the keyboard 51.

Thereafter, the terminal identification number of the portable card reader device being store in the memory unit 53 in advance read out, and credit card data such as the credit card number, the expiration date, and the money amount for the merchandise, the merchandise classification number, the tracing code, and the authentication number are formed into a batch of terminal collected information, and then the terminal collected information is transmitted from the wireless communication I/F unit 19 to the home delivery management server 4.

When credit card inquiry information has been made based on in advance installed plural credit card inquiry information by portable card reader device 2 through the wireless communication line 8, printer 61 achieves the function of printing a receipt with the tracing code of merchandise, the credit card company, the money amount for the merchandise, method of payment, and number of payment.

Next, the composition of the keyboard 51 on the portable card reader device 2 is the same as the composition in FIG. 3 that is explained for the first embodiment of the invention; therefore the function of keyboard is not need to explain again. Also, the settlement server 13 at the credit card company composed of the same as the settlement server 37 in FIG. 4 for the first embodiment of the invention, and the home delivery management server 13 composed of the same as the home delivery management server 39 in the FIG. 5 for the first embodiment of the invention.

Figure 17:
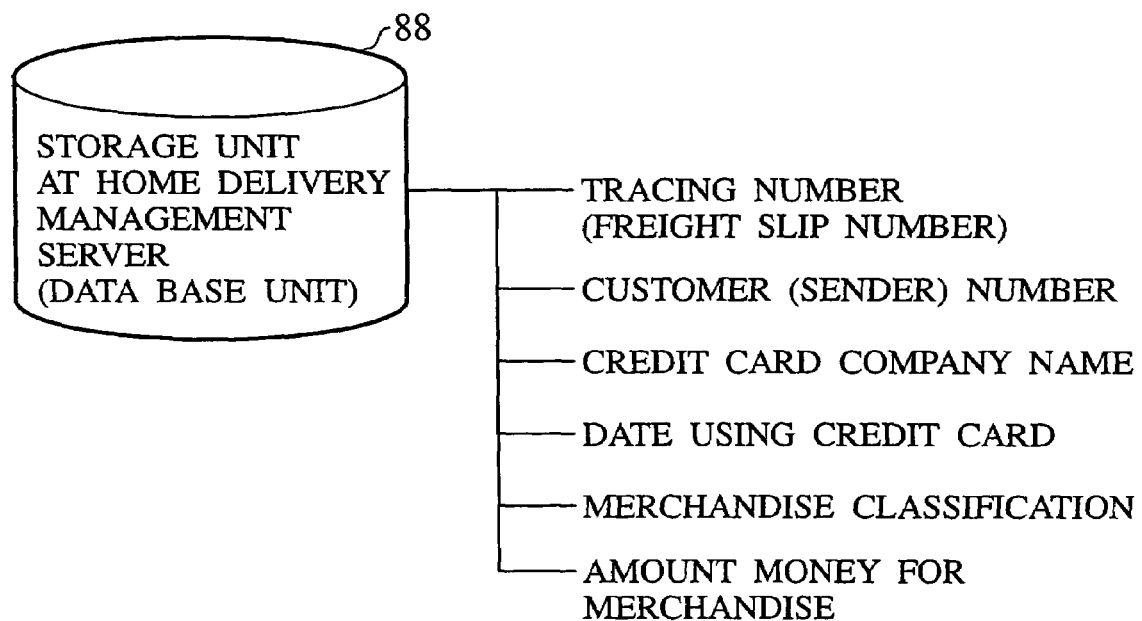
FIG. 17 is a view showing a structure of database of storage in a storage unit 88 on a home delivery management server 12.

However, the storage unit 12 at the home delivery management server 12 is different from the one explained in FIG. 6 for the first embodiment of the invention, and it is shown as FIG. 17.

The second embodiment of the present invention credit card settlement system will be described below.

(1) Preparation for the Delivery

Home delivery service contractor needs to make contracts with plural credit card companies for a membership in advance. Also, home delivery contractor need to make merchandise price collection consignment contract for home delivery contracts with corporative or private sellers for surrogate money collection business for merchandise.

At that time, the home delivery contractor registers the necessary information such as address of the merchandise seller (sender), telephone number, account number to be paid the amount money for the merchandise and like with the home delivery management server and like as a data, and assign customer (seller) number to each merchandise seller. Thus, when the customer number is known, the information regarding to the merchandise can de grasped.

For example, when the consumer orders specific merchandise that he/she wants to purchase to the merchandise seller, the merchandise seller asks home delivery service contract that made a contract for the merchandise price collection consignment to deliver the ordered merchandise to the home of consumer.

When the home delivery contractor receives the delivery order, the contractor stick the slip that is printed receiver address, receiver name, sender address, sender name, tracing code and like, and the tracing code and customer number of sender (merchandise seller) are stored at the home delivery management server and like.

(2) Portable Card Reader Device Performance on Delivery

When the delivery man of the home delivery contractor delivers the merchandise, a credit card that the consumer holding is handed to the delivery man. The delivery man of the home delivery contractor swept the credit card to the portable card reader device, and a credit card information such as credit card company recorded on the credit card, credit card number, expiration date, and like are read by card reader, and stored at the memory unit 53 (step T10).

In the step T20, the delivery man of the home delivery contractor inputs the merchandise classification code by the [number] key on the keyboard 51, and stores it at the memory unit 53.

In the step T30, the delivery man inputs tracing code by the [number] key on the keyboard 51, and stores it as the memory unit 53.

In the step T40, delivery man inputs amount price for the merchandise by the [number] key on the keyboard 51, and stores it as the memory unit 53.

As a result, the name of the credit card company, merchandise classification, freight slip number showing tracing code, and price are indicated, and the same time, [press set key] is indicated as guidance information on the indication screen on the display 59.

In the step T50, when the delivery man presses the [set] key on the keyboard 51, method of the payment such as a lump-sum payment, revolving payment, installment plan payment, bonus month payment, bonus month and installment plan payment will be displayed above the [select] key on the display 59, and the same time, guidance information [choose the method of the payment] will be indicated to make consumer choose method of payment from payment plans. Then, assuming that the home delivery contractor asks consumer the method of the payment and the consumer chooses the choice of method of the payment.

In the step T60, one of the method of the payment chosen on the display 59 indicating is inputted by choosing [select] key on the keyboard 51. For instance, corresponding the request of the consumer, when the home delivery contractor presses the PF3 [installment plan payment], the procedure of the inputting the data is the same as above in explanation for the first embodiment of the present invention.

The inputted method of payment and the amount price for the merchandise like this is stored at the memory unit 53.

When the home delivery contractor inputs [settlement] key on the keyboard 51 after completing inputting all data, go on the next step T70.

In the step T70, read credit card information is sent to the settlement server 13 through the home delivery management server 12, and obtain the credit card inquiry information of the said credit card. The credit inquiry at that time is whether this credit card is valid (able to settle) or invalid (unable to settle). Sequence S1, S2, S3, and S4 show the flow of this.

In the sequence S1, the credit card information read by the portable card reader device 11 is sent to the home delivery management server 12 through the wireless communication line 8. In the sequence S2, already read credit card information sent to the home delivery management server 12 is sent directly to the settlement server 13 at the credit card company through exclusive communication line 7. At that time, the read information is not left at the home delivery management server 12. The settlement server 13 extracts corresponding credit inquiry. In the sequence S3, the credit inquiry is sent to the home delivery management server 12 through the exclusive communication line 7.

In the sequence S4, the credit inquiry sent to the home delivery management sever 12 us sent to the portable card reader device 11 from the home delivery management server 12 through the wireless communication line 8. The credit card inquiry information is not left at the home delivery management server 12 as well.

Then, the credit card is valid to settle, in the step T90, the control unit 55 controls the temporally stored information such as tracing code, method of payment, the amount money for merchandise, merchandise classification, credit card company, credit card number, expiration date the date of using the credit card and like forming into a batch of terminal collected information and stores to the memory unit 53 again.

In the step T100, the control unit 55 read the above said settlement information out from the memory unit 53, and sends it to the settlement server 13 through the home delivery management server 12. The sequence S5 and S6 show this flow. In the sequence S5, method of payment, tracing code, the amount money for merchandise, merchandise classification, credit card company, credit card number, expiration date the date of using the credit card and like are sent to the home delivery management server 12 from the portable card reader device 11 through the wireless communication line 8. In the sequence S6, received information sent to the home delivery management server 12 is sent directly to the settlement server 8 through the exclusive communication line 7. The settlement information sent from the home delivery management server 12 in stored at the settlement server 13 at the credit card company.

The home delivery management server 12 does not store the all settlement information sent by the portable card read device 11, but only stores tracing code, name of the credit card company, the date using the card, merchandise classification, and the amount money for the merchandise, and deletes all other information.

Regarding to the credit card number and the expiration date, these are not necessary for the home delivery contractor, and it is essential to deletes these information to prevent leaking information.

As explained above, corresponding tracing code and customer (sender) number are stored a the database, so extracting customer number corresponding tracing code of settlement information from the portable card reader device 11 out of it, and connects with a batch of terminal collected information such as tracing code, name of the credit card company, date of using the credit card, merchandise classification, payment, the amount money for merchandise, and stores at the home delivery management server 12.

The composition of the database is shown in FIG. 17 as a storage unit 88 at home delivery management server 12.

The data stored at the storage unit 88 is organized each data such as customer number corresponding each tracing code, name of credit card company, the date of using the credit card, merchandise classification, and the amount money for the merchandise by the tracing code as a key making the lead recording. In the step T110, tracing code of the merchandise, the name of the credit card company, amount price for the merchandise, method of the payment, number of the payment and like are read out and adding the date reading out of the timer as a delivery date to make a receipt showing the merchandise is settled, and input this receipt information to the printer 61 to print out the receipt.

As a result, a shown in FIG. 10, a sales slip 93 is printed out of the printer 61 as a receipt. The method of the payment, number of the payment when installment plan payment is chosen, merchandise classification, slip number showing tracing code, price, signature box, and like are on this sales slip 93.

In the step T120, the settlement information stored at the memory unit 53 is completely deleted and complete performance. The printed receipt is torn from the printer 61 and handed into the consumer by the home delivery contractor. As explained, after each performance to print out the receipt, the personal information such as the credit card information is not left at the portable card reader device 2 to prevent leaking information and also, the memory capacity inside of the portable card reader could be small.

On the other hand, when the credit inquiry sent by the settlement server 13 means invalid, go to step T130 from step T80, and the control unit 55 read message information [this credit card company is unavailable] out of the memory unit 53 for example, and displays error indication on the display 59. At the same time, the control unit 55 deletes temporally stored information such as credit card number of the consumer, expiration date, and like at the internal RAM at the memory unit 53, and inputted information by the keyboard 51, and complete the performance.

(3) The Operation After Completing Delivery

The settlement by the card is approved, in the sequence S7, the merchandise seller receives amount money for the merchandise from the home delivery contractor. The way to credit the amount money for the merchandise is based on the data file that is made at the storage unit 88 at the home delivery management server 12 shown in the FIG. 17. The data stored amount money for the merchandise with customer (sender) number, so it is able to find address, name, and bank account number of sender by the customer number referring other database, and it is possible to credit the amount money for the merchandise. Also, it is useful to check the date of using the credit card and like later on.

Next, in the sequence S8, the merchandise seller credits the merchandise home delivery (shipping charge) to the home delivery contractor.

At that time, as described in the explanation for the FIG. 13, the procedure that the home delivery contractor receives delivery charge from the seller, that is sequences S8, is not necessary when they have a contract to charge the amount that subtracted delivery charge from amount money for the merchandise between home delivery contractor and the seller.

In the sequence S9, all settlement centering the home delivery contractor is completed when the credit card company credits amount for the merchandise to the home delivery contractor.

What is claimed is:

1. A portable card reader device that is carried by a home delivery contractor responsible for delivering a merchandise that is addressed to a consumer residing in a certain designated delivery area, for settling a cost for the merchandise by using a settlement card, the portable card reader device comprising:

a storing unit configured to store a plurality of credit inquiry information of a plurality of consumers residing within the certain designated delivery area and a plurality of freight information related to a plurality of merchandisers that deliver within the certain designated delivery area;

a reading unit configured to read a card information stored in the settlement card that is used by the consumer for settlement upon delivery of the merchandise to the consumer;

an input unit configured to input a payment method for the merchandise;

a credit inquiry processing unit configured to perform credit inquiry processes of the settlement card based on the credit inquiry information of the plurality of consumers stored in the storing unit and based on the card information read by the reading unit; and a control unit configured to control the storing unit, reading unit, input unit, and credit inquiry processing unit, wherein:

the freight information includes a cost information of the merchandise and an invoice number of an invoice which is attached to the merchandise; and the control unit retrieves the freight information which coincides with the card information read by the reading unit when the result of the credit inquiry processes is valid and thereafter performs, when the freight information that coincides with the card information read by the reading unit exists, settlement based on the cost information, generates a settlement information related to the merchandise that has been settled based on the card information, the invoice number, and the cost information, and the control unit controls thereafter the settlement information to be stored in the storing unit.

2. The portable card reader device of claim 1, further comprising:

a printing unit configured to print a receipt showing a settlement of one amount of money for merchandise based on the result of the credit inquiry processes in the credit inquiry processing unit.

3. The portable card reader device of claim 2, wherein:

the printing unit prints the payment on the receipt when a payment of a lump-sum payment, an installment plan payment, or a revolving payment is chosen and inputted with the input unit.

4. The portable card reader device of claim 3, wherein:

the printing unit prints a number of the payment on the receipt when printing the installment plan payment or the revolving payment is chosen as method of the payment.

5. The portable card reader device of claim 2, wherein:
the printing unit prints a total number and total amount of money of each of the lump-sum payment, the installment plan payment, and the revolving payment as a daily list regarding the plurality of consumers using the settlement card.

6. The portable card reader device of claim 1, wherein:
the credit card inquiry processing unit generates an invalid credit card information when a credit card number of the consumer matches a credit card number in a black list based on the credit card inquiry information; and
the black list includes a plurality of credit card numbers of consumers that are not valid for settlement.

7. A card settlement system, comprising:
a settlement server of a credit company configured to store a plurality of credit inquiry information regarding a plurality of consumers and to send the credit inquiry information;
a home delivery management server of a home delivery contractor configured to store a plurality of freight information related to a plurality of merchandise and to send the freight information;
a communication terminal that is provided in a branch of the home delivery contractor and connected to the settlement server and the home delivery management server through a communication line, the communication terminal being configured to receive the credit inquiry information related to a plurality of consumers residing within a delivery area where the branch is in charge from the settlement server through the communication line, and the freight information related to the merchandise that are delivered within the delivery area from the home delivery management server; and
a portable card reader that is connectable to the communication terminal, the portable card reader being configured to receive and store the credit inquiry information related to the plurality of consumers residing within the delivery area and the freight information from the communication terminal, to read a card information of a settlement card that is used by the consumer for settlement when the merchandise is delivered to the consumer, to input a payment method of the merchandise, perform a credit inquiry processes of the settlement card based on the stored credit inquiry information of the plurality of consumers and based on the card information of the settlement card of the consumer, and to settle, when the result of credit inquiry indicates that the settlement card is valid, the cost of the merchandise included in the freight information, wherein:
the freight information further includes a cost information of the merchandise and an invoice number of an invoice which is attached to the freight; and
a control unit of the portable card reader retrieves whether the freight information that coincides with the read card information exists when the result of the credit inquiry process is valid, and the control unit performs, when the freight information that coincides with the card information exists, settlement based on the cost information.

8. The card settlement system of claim 7, wherein:
the portable card reader stores the credit card inquiry information and the freight information regarding the consumer as a settlement information when the merchandise is handed to the consumer and the settlement of the merchandise completed and sends stored settlement information to the communication terminal; and
the communication terminal transmits received settlement information from the portable card reader to the settlement server of the credit card company and the home delivery management server of the home delivery contractor through the communication line.

9. The card settlement system of claim 8, wherein:
the portable card reader deletes the settlement information stored by a settlement information storing unit after sending the settlement information that is stored by the settlement information storing unit to the communication terminal.

10. A card settlement system, comprising:
a settlement server configured to store credit of a plurality of inquiry information of a plurality of consumers;
a home delivery management server connected to the settlement server through a private line and configured to store a plurality of freight information including a merchandise identification information allocated to a freight and an invoice which is attached to the freight; and
a portable card reader that is connectable to the home delivery management server through wireless communication, wherein:
the portable reader reads a card information from a settlement card upon delivery of freight to the consumer and performs wireless sending of a terminal collected information including the card information and the freight information of the freight to the home delivery management server, thereafter the home delivery management server acquires the card information for the received terminal collected information and sends the information to the settlement server, thereafter the settlement server determines whether the card information is valid or not on the basis of the received card information and sends the result of determination to the home delivery management server, thereafter the home delivery management server performs wireless communication for sending of the result of determination to the portable card reader, and thereafter the portable card reader outputs the received result of determination.

* * * * *

UNITED STATES PATENT AND TRADEMARK OFFICE
CERTIFICATE OF CORRECTION

PATENT NO. : 7,011,246 B2 Page 1 of 1
APPLICATION NO. : 10/488097
DATED : March 14, 2006
INVENTOR(S) : Kazutaka Nanbu et al.

It is certified that error appears in the above-identified patent and that said Letters Patent is hereby corrected as shown below:

On the title page, Item (86), the § 371 Date is incorrect. Item (86) should read:
--(86) PCT No.: PCT/JP02/09202

§ 371 (c)(1),
(2), (4) Date: October 4, 2004 --

Signed and Sealed this

Fifteenth Day of August, 2006

JON W. DUDAS
*Director of the United States Patent and Trademark Office*